(No Model.)　　　　　　　　　　J. LEMOINE.　　　　　　　7 Sheets—Sheet 1.
VEHICLE BRAKE.
No. 441,801.　　　　　　　　　　　　　Patented Dec. 2, 1890.
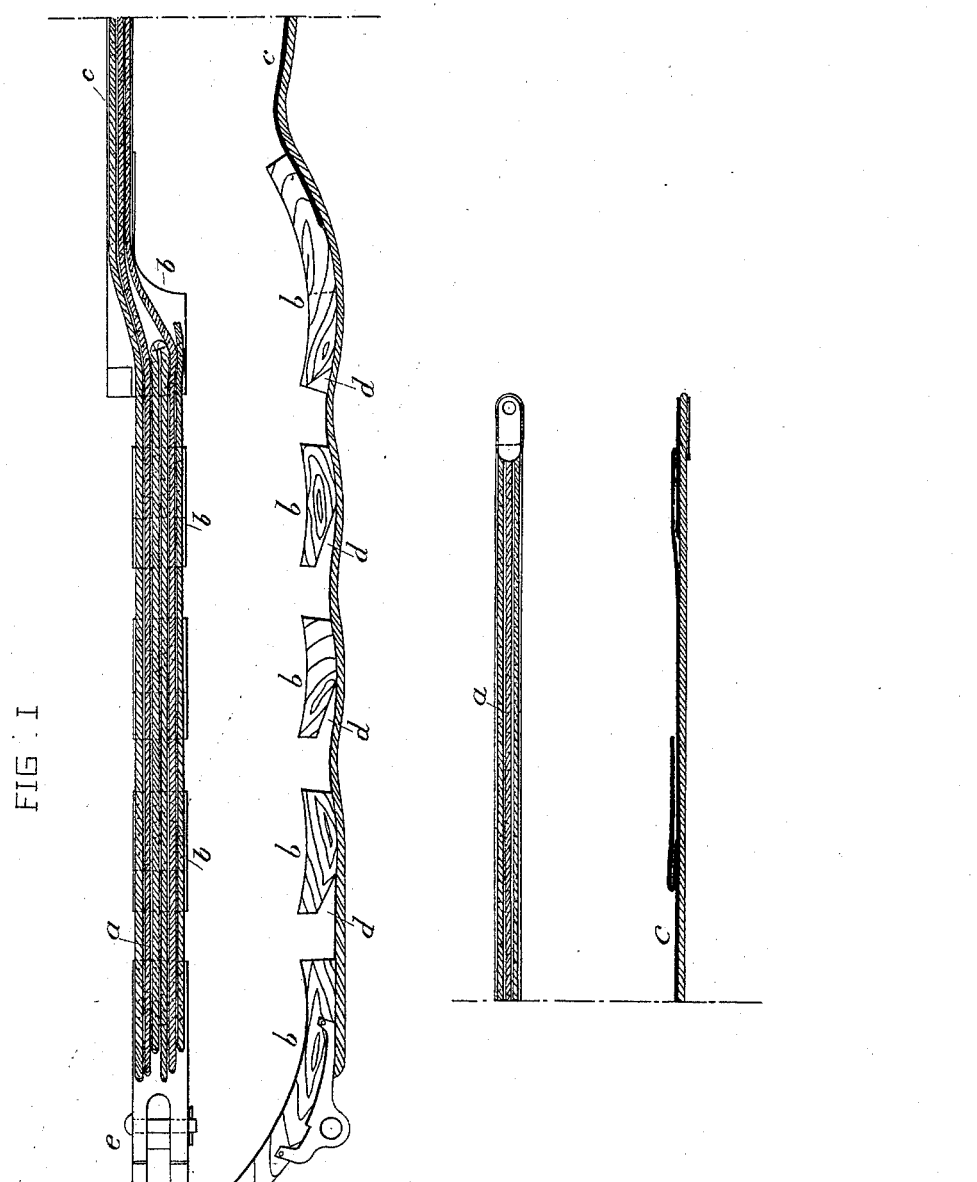
WITNESSES:
INVENTOR
Jules Lemoine
BY
ATTORNEYS.

(No Model.) 7 Sheets—Sheet 2.

J. LEMOINE.
VEHICLE BRAKE.

No. 441,801. Patented Dec. 2, 1890.

WITNESSES
C. A. Dieterich
E. Botchon.

INVENTOR.
Jules Lemoine
BY Briesen, Steele & Knauth
ATTORNEYS.

(No Model.) 7 Sheets—Sheet 3.

J. LEMOINE.
VEHICLE BRAKE.

No. 441,801. Patented Dec. 2, 1890.

WITNESSES:
C. H. Dieterich
C. Botschon

INVENTOR
Jules Lemoine
BY
Briesen, Steele & Knauth
ATTORNEYS.

(No Model.) 7 Sheets—Sheet 4.
J. LEMOINE.
VEHICLE BRAKE.
No. 441,801. Patented Dec. 2, 1890.
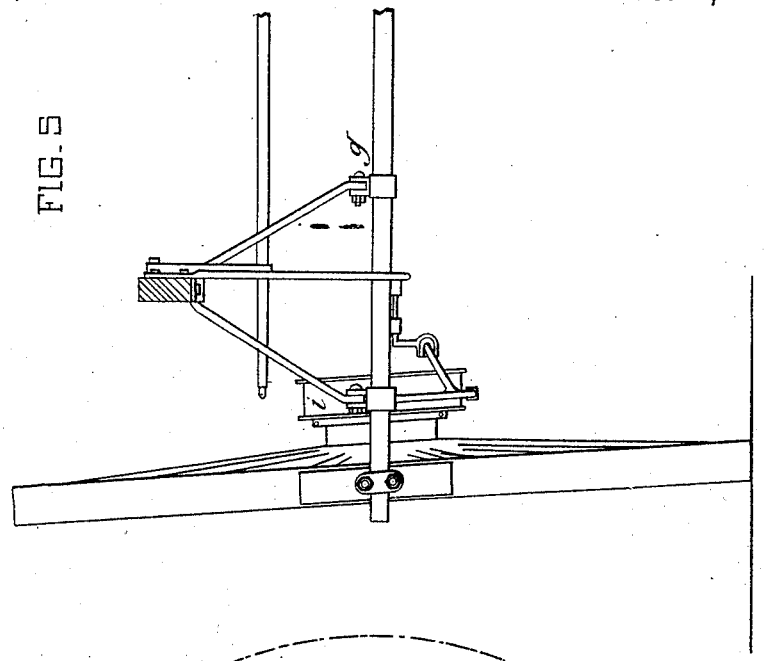
FIG. 5
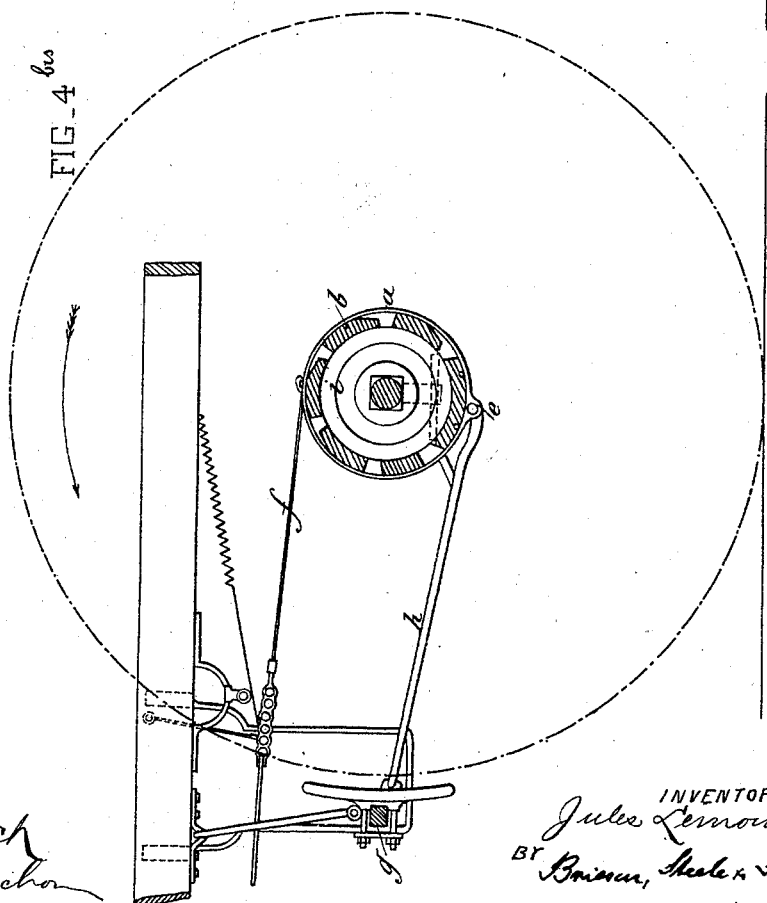
FIG. 4 bis
WITNESSES:
INVENTOR
Jules Lemoine
BY
ATTORNEYS.

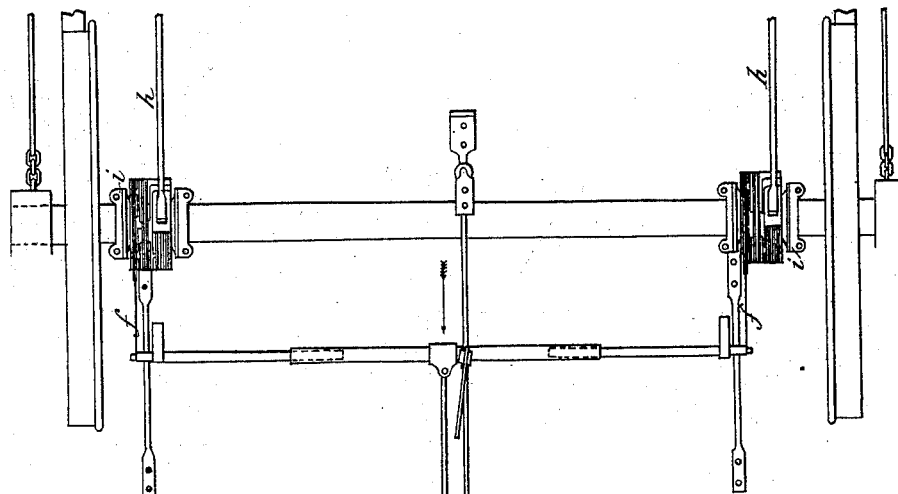
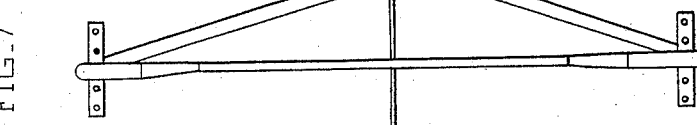
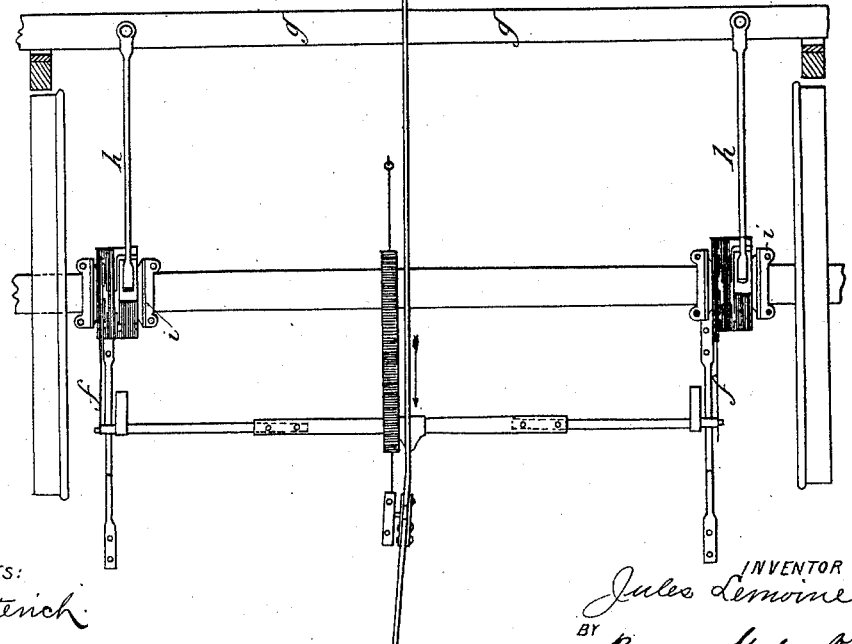

(No Model.) 7 Sheets—Sheet 6.
J. LEMOINE.
VEHICLE BRAKE.
No. 441,801. Patented Dec. 2, 1890.
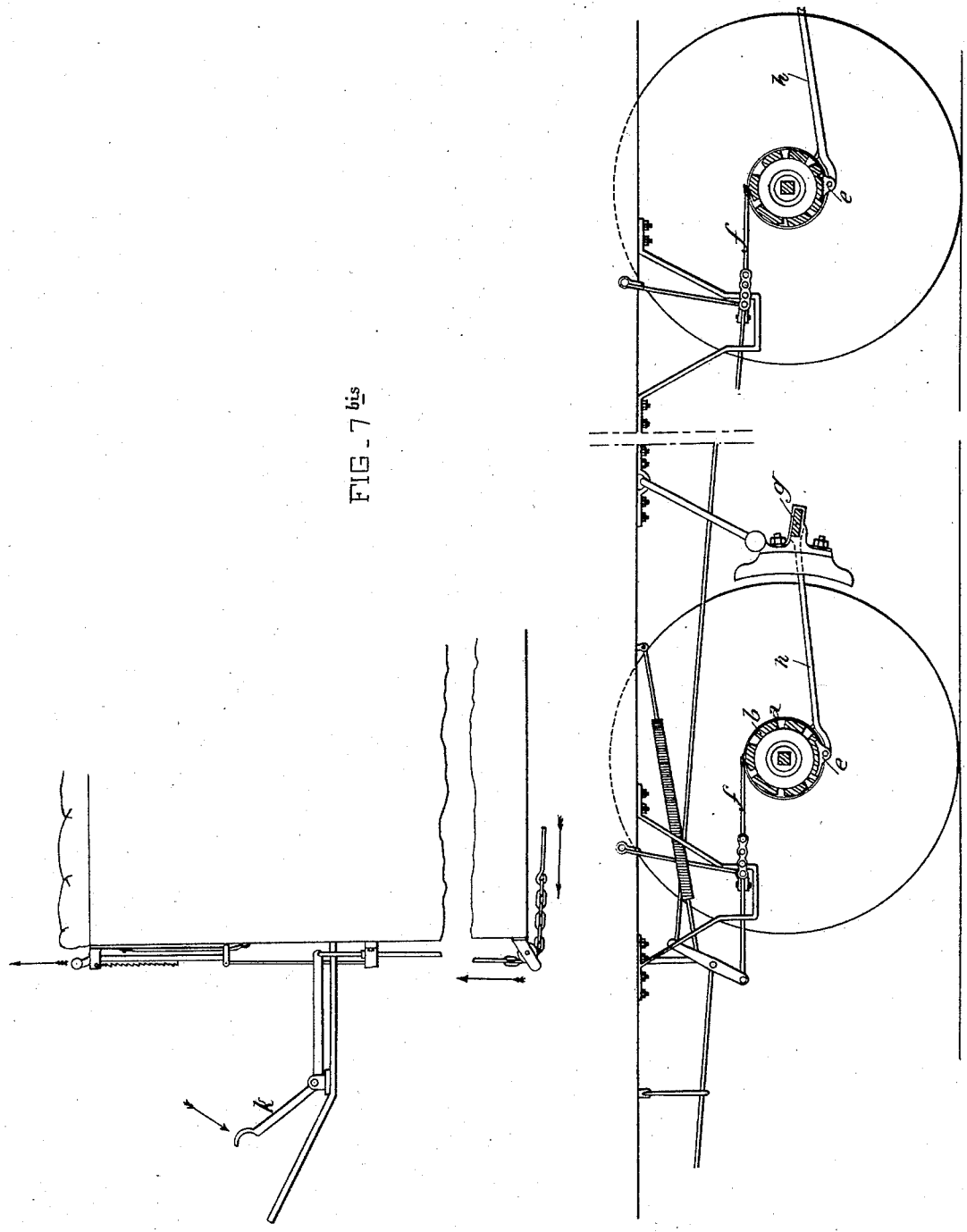
WITNESSES:
INVENTOR
Jules Lemoine
BY
Briesen, Steele & Knauth
ATTORNEYS.

(No Model.) 7 Sheets—Sheet 7.
J. LEMOINE.
VEHICLE BRAKE.

No. 441,801. Patented Dec. 2, 1890.

WITNESSES:
INVENTOR,
Jules Lemoine
BY
ATTORNEYS.

UNITED STATES PATENT OFFICE.

JULES LEMOINE, OF VINCENNES, FRANCE.

VEHICLE-BRAKE.

SPECIFICATION forming part of Letters Patent No. 441,801, dated December 2, 1890.

Application filed September 19, 1889. Serial No. 324,470. (No model.) Patented in England July 11, 1884, No. 10,068, and in France September 26, 1887, No. 186,070.

*To all whom it may concern:*

Be it known that I, JULES LEMOINE, engineer, of Vincennes, near Paris, France, have invented an Improved Brake for Vehicles, (for which I have obtained Letters Patent in France for fifteen years, dated September 26, 1887, No. 186,070, and in England for fourteen years, No. 10,068, dated July 11, 1884,) of which the following is a specification.

This invention relates to an improved brake for vehicles, consisting of a flat composite-wire cable of decreasing breadth, which is flexible, non-extensible, and non-vibratory, thus combining all the conditions which are indispensable in practice for the efficient working of brakes of this kind. For road-vehicles the cable is coiled helically upon the nave of the wheel, and upon the axle in the case of tramway-vehicles.

Reference is to be had to the accompanying drawings, forming part of this specification, wherein—

Figure 3:
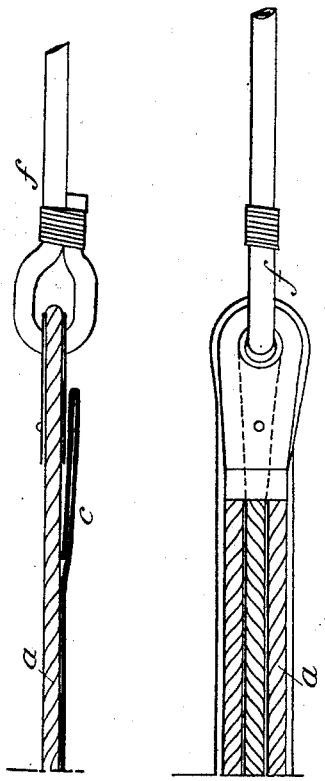
Figure 2:
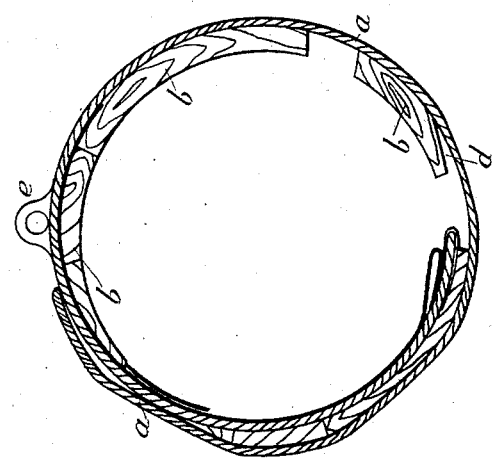
Figure 4:
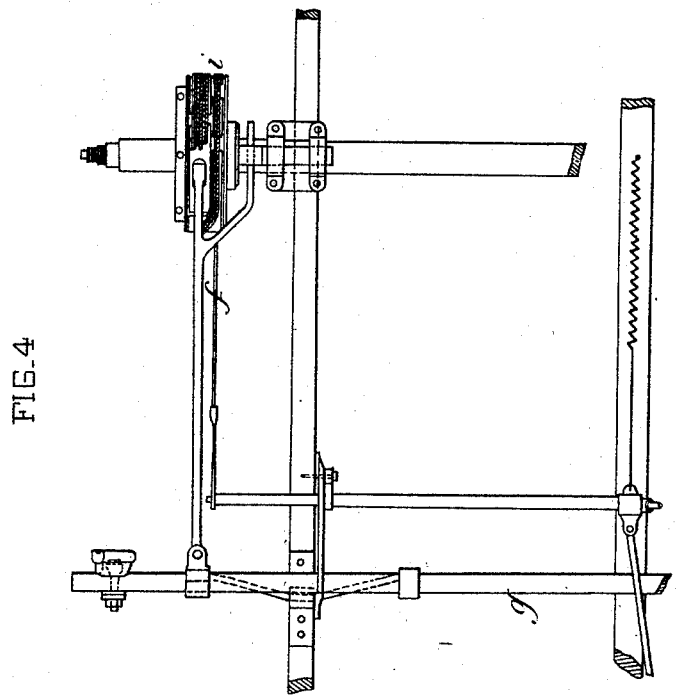
Figure 6:
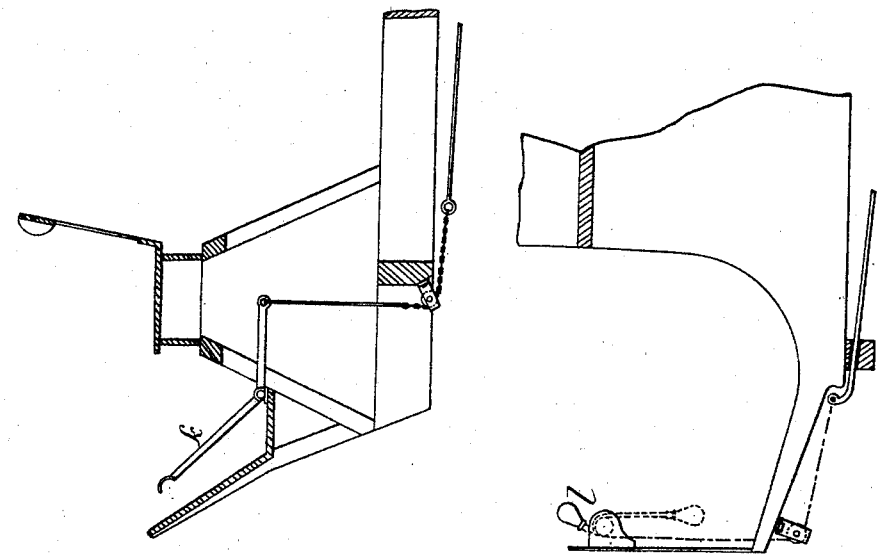
Figure 8:
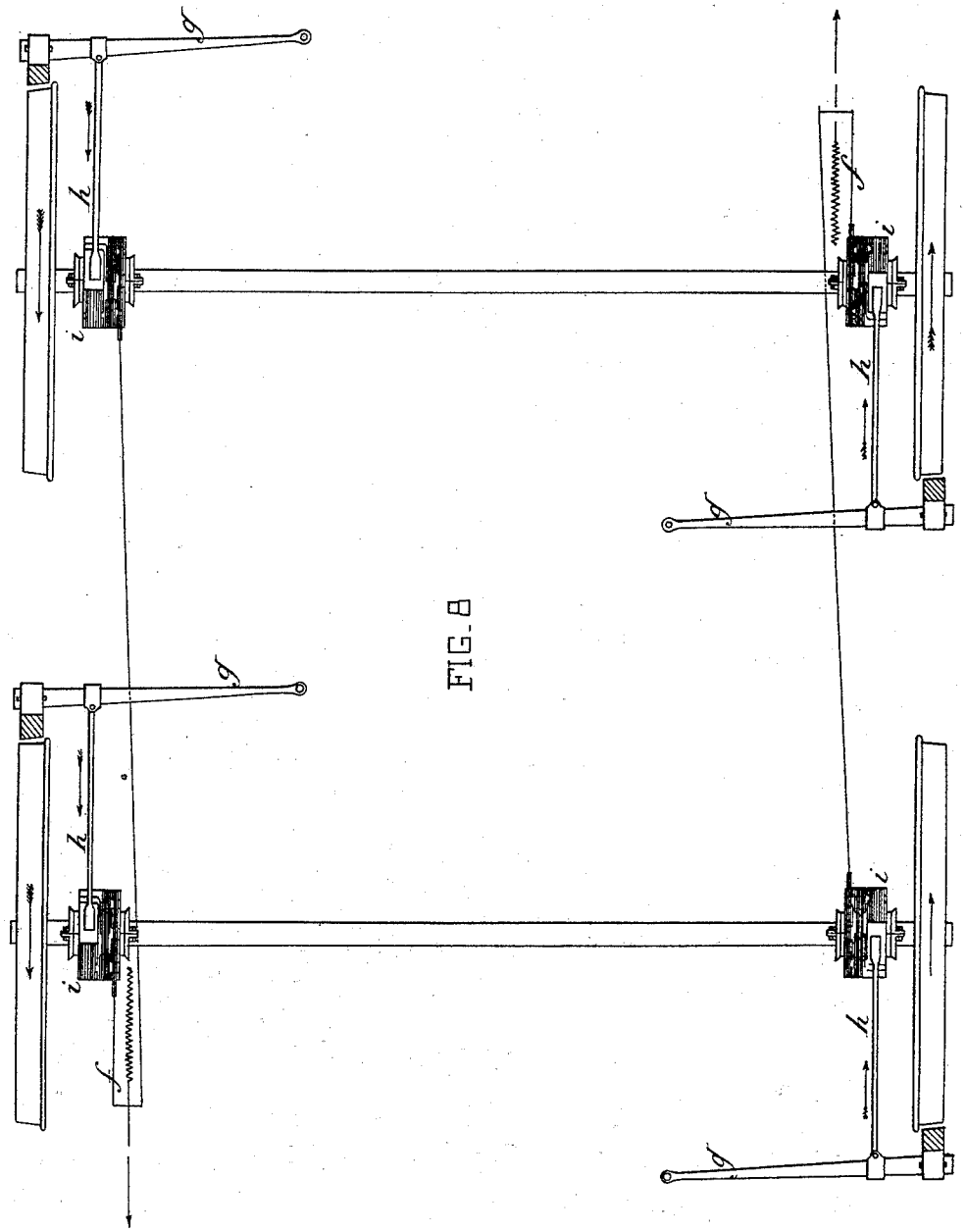

Figure 1 represents a development and edge view of the cable. Fig. 2 is a side view of the cable-brake strap coiled upon its drum. Fig. 3 is a plan and edge view of the attachment for the end of the cable. Figs. 4 and 4$^{bis}$ are a plan and transverse section, and Fig. 5 is a rear view of the cable as applied to an omnibus and to ordinary vehicles. Fig. 6 represents the means for operating the brake-lever with the aid of the driver's foot or hand. Figs. 7 and 7$^{bis}$ are a plan view and transverse section of the cable-brake applied to tramway-vehicles running only in one direction. Fig. 8 is a plan view showing its application to tramway-vehicles running in both directions.

The same letters of reference represent like parts in all the figures.

I will in the first place describe the cable itself, forming the principal object of the invention, and then explain the manner in which it is applied to ordinary vehicles and to tramway-vehicles running in one or both directions.

1. *Construction of the cable.*—The cable is composed of metal strands $a$, juxtaposed so as to form by their union a flat band of varying breadth, and provided on the inner side with frictional surfaces, consisting, in the present example, for the first coil of wood blocks $b$, and for the whole or a portion of the second coil of leather $c$. The wood blocks $b$ are made of such form as to insure a uniform pressure upon the sleeve or drum—that is to say, the pressure of each block, instead of decreasing, is rendered uniform by the beveled part $d$ being opposed to the initial point of the cable, by which means all vibration is prevented. All the strands $a$ are united to a joint-piece $e$, by which the initial point of the cable is hinged at the tangent. To the final point of the cable is attached a flexible connection $f$.

2. *Ordinary vehicles*, (Figs. 4 and 4$^{bis}$.)—In the case of ordinary vehicles the brake-strap is usually applied in connection with a transverse bar $g$, carrying the brake-shoes, hung from the body just in front of the hind wheels. A tension-rod $h$ connects the bar $g$ to the initial point $e$ of the cable beneath the axis of the hub. The cable is coiled one and one-half turns around a drum $i$, keyed on the hub. The flexible connection $f$, passing above the axis of the hub, is connected with the driver's brake-operating gear, which may either consist of a pedal $k$, hand-lever $l$, or rack, Fig. 6, whereby the motion of the vehicle may be either checked or arrested by a slight effort. The brake in this case, as in all the subsequent cases, operates as follows: Tension is applied to the flexible connection $f$, tightening the coils of the cable and eventually forcing the brake-shoes upon the wheel. The brake-shoes are not necessarily used unless a sudden stop of the vehicle is desired, the friction of the coil about the hub being sufficient in ordinary cases to retard the motion of the vehicle.

3. *Tramway-cars running in one direction only*, (Fig. 7.)—The cable makes two turns around a drum keyed on each axle, the transverse brake-shoe carrier $g$ is placed in rear of the wheels, and the tension-rod $h$ is connected tangentially above the drum to the initial point $e$ of the cable. The opposite end of the cable is also attached to a flexible connection $f$ above the center of the axle, and is connected with the driver's brake-operating gear.

4. *For tramway-carriages running in both directions,* (Fig. 8.)—The cable also passes twice around the drum; but the transverse brake-shoe carrier is replaced by four short brake-carriers $g$, placed in rear of the wheels, tho seat the right hand only for the time being being operative. There are four tension-rods $h$ attached to the joint-piece of the cable in a similar manner to that described for cars running in one direction only, with this difference, that the brake-operating gear acts on the brakes of the right-hand wheels only for the time being instead upon all four wheels.

The advantages of my brake are the facility with which it can be operated, owing to the arrangement of helically-wound coils and the quickness with which the vehicle can be brought to a standstill by means of the above-described arrangement.

I claim—

A brake for vehicles, consisting of a cable of diminishing breadth wound helically about a drum secured to the axle, or on the axle itself, as many turns as desired, said coil being provided for the first turn with frictional blocks of suitable material, the remaining turns consisting of leather or other flexible material, as and for the purposes specified.

The foregoing specification of my improved brake for vehicles signed by me this 3d day of September, 1880.

JULES LEMOINE.

Witnesses:
 R. J. PRESTON,
 ALBERT MOREAU.